UNITED STATES PATENT OFFICE.

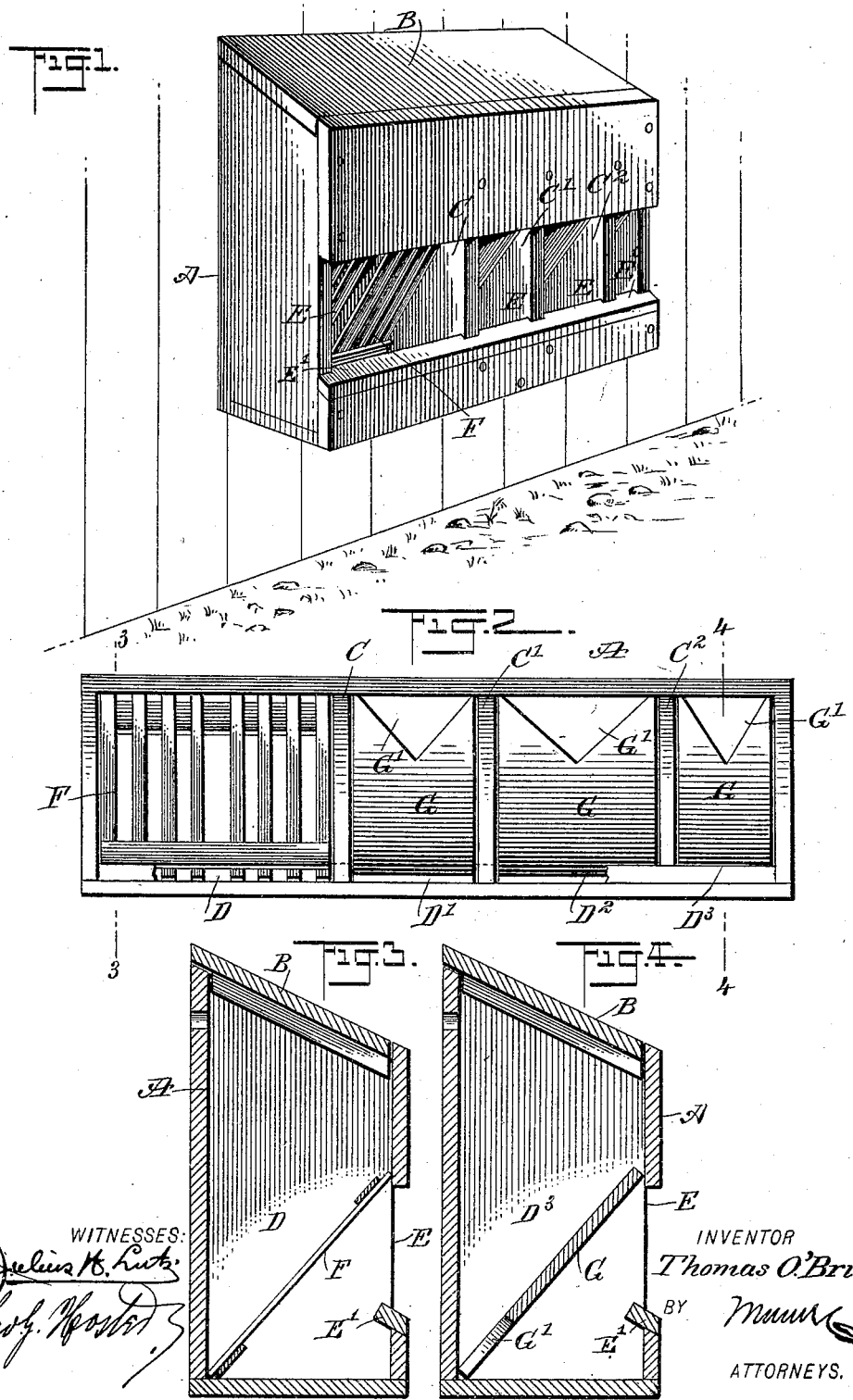

THOMAS O'BRIEN, OF BRANFORD, CONNECTICUT.

POULTRY LUNCH-BOX.

No. 807,197. Specification of Letters Patent. Patented Dec. 12, 1905.

Application filed March 22, 1904. Serial No. 199,438.

*To all whom it may concern:*

Be it known that I, THOMAS O'BRIEN, a citizen of the United States, and a resident of Branford, in the county of New Haven and State of Connecticut, have invented a new and Improved Poultry Lunch-Box, of which the following is a full, clear, and exact description.

The invention relates to poultry culture; and its object is to provide a new and improved poultry lunch box for containing grit, shells, charcoal, cut clover, and like materials arranged as a self-feeder and constructed to allow the poultry to have ready access to the separated compartments containing the different materials without danger of the poultry causing a mixing of the different materials in the several compartments, thereby avoiding waste of the materials.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a plan view of the same, the cover being removed. Fig. 3 is a transverse section of the improvement on the line 3 3 of Fig. 2, and Fig. 4 is a similar view of the same on the line 4 4 of Fig. 2.

The improved poultry lunch-box is in the form of a box proper, A, hung up on the wall in a scratching-shed a suitable distance from the floor, as plainly illustrated in Fig. 1, and the said box A is provided with a sloping cover B, adapted to be removed for filling the lunch-box with the desired materials, as hereinafter more fully explained.

The box A is provided with a plurality of transverse partitions C, C', and C² to form separated compartments D, D', D², and D³, access to which is had by front openings E a distance above the bottoms of the compartments. The compartment D is adapted to contain cut clover or the like, while the compartment D' is charged with bone-meal, the compartment D² with oyster-shells, and the last compartment D³ is filled with grit. The compartment D is provided with a feed-rack F, formed of slats, extending upwardly and forwardly from the rear lower end of the compartment to the front thereof, as plainly shown in Fig. 3, to support the cut clover in the upper portion of the compartment and to allow the poultry to have access to the space in front of the rack and to the cut clover on the rack by providing the front of the box with an opening E a distance above the floor bottom of the box. Racks G are arranged or in the other compartments D', D², and D³; but the racks G are made from a solid board formed at its lower end with a V-shaped cut G', through which the material can pass into the space in the front portion of the corresponding compartment, and to which portion leads the opening E in the front of the box. Now the racks G extend upwardly and forwardly from the rear lower end of the compartments D', D², and D³ the same as the slatted rack F to support the materials in the upper portions of the compartments and to allow the material to feed through the cuts G' into the space in the front lower portions of the compartments, and to which space access is had by the openings E. Inwardly and upwardly extending flanges E' form the bottoms of the openings E to prevent the poultry from scattering the feed out of the compartments.

Now it is evident that the poultry can get a particular material only in the corresponding compartment D, D', D², or D³, and by having the partitions C, C', and C² extending transversely from the front to the rear of the box it is evident that the poultry in poking in the material cannot spill the contents of one compartment into the adjacent compartment and then on the floor, and hence the materials of the different compartments are not liable to become mixed. It is understood that if the materials should become mixed the poultry would poke in the compartment containing the mixed materials until it had scattered it out of the compartment on the floor, and thus wasted nearly all the material not desired in order to find the material the poultry desired to feed on for the time being.

The middle slats of the rack F are spaced farther apart than the remaining slats to form an opening in the slatted rack F sufficiently large for the poultry to poke the head through the middle slats to allow the poultry to pull down some of the clover supported on the rack in the upper portion of the compartment D.

It is understood that other materials than those specified may be placed in the several compartments. The racks F and G are removably held in the several compartments, so as to allow convenient cleansing of the several compartments whenever it is desired to do so.

Having thus described my invention, I claim as new and desire to secure by Letters Patent—

1. A poultry lunch-box, comprising a box having an opening in its front and provided with vertical partitions extending from front to rear and dividing the box into a plurality of compartments, each having a front opening, the openings being above the bottoms of the compartments and having inwardly and upwardly inclined flanges on their bottom walls, and an inclined rack in each compartment for supporting the material in the upper portion thereof the racks having openings and extending from the lower rear sides of the compartments to the fronts of the same above the openings, and forming receptacles in the bottoms of the compartments, as set forth.

2. A poultry lunch-box, comprising a box having an opening in front and provided with vertical partitions dividing the box into a plurality of compartments, each having a front opening, the openings being above the bottoms of the compartments, and an inclined rack in each compartment for supporting the material in the upper portion thereof, the racks extending from the rear sides of the compartments to the fronts of the same above the openings and forming receptacles in the bottoms of the compartments.

3. A poultry lunch-box comprising a box having a compartment formed with an opening in the front, the bottom wall of the opening being a distance above the bottom of the compartment, and a slatted rack in the said compartment, extending upwardly and forwardly from the lower rear portion of the compartment to the front thereof, a pair of adjacent slats of the rack being spaced farther apart than the remaining slats, as set forth.

In testimony whereof I have signed my name to this specification in the presence of two subscribing witnesses.

THOMAS O'BRIEN.

Witnesses:
THEO. G. HOSTER,
JNO. M. RITTER.